Figure 1:
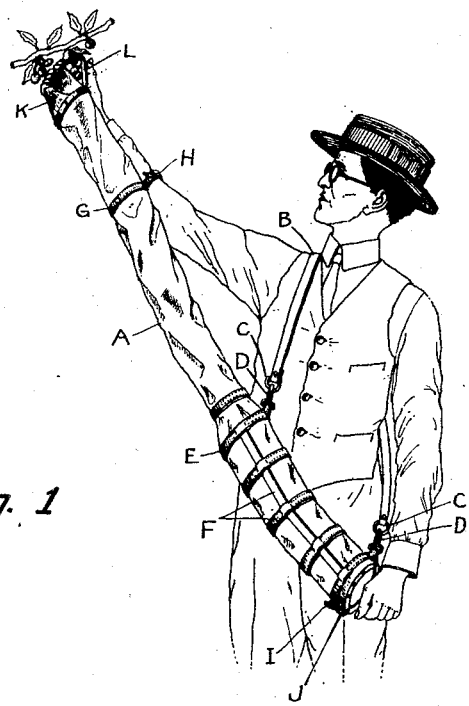

Sept. 21, 1926.

R. C. RICKETTS 1,600,566

FRUIT PICKER

Filed Jan. 27, 1925 3 Sheets-Sheet 1

INVENTOR.
Roland C. Ricketts
BY
M. C. Frank
ATTORNEY.

Sept. 21, 1926.
R. C. RICKETTS
1,600,566
FRUIT PICKER
Filed Jan. 27, 1925
3 Sheets-Sheet 2
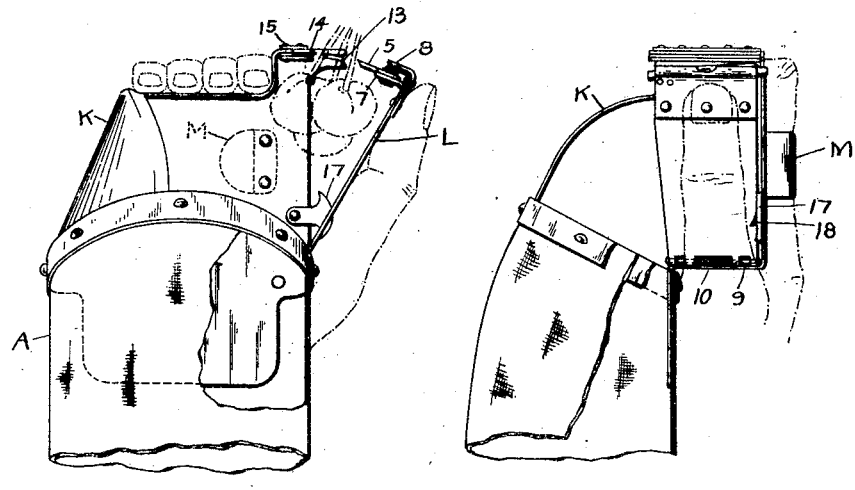
Fig. 3       Fig. 4
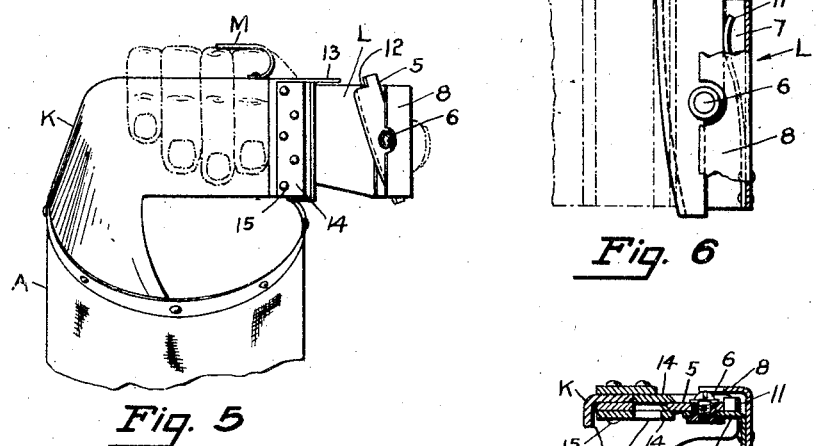
Fig. 5
Fig. 6
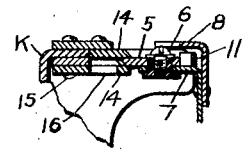
Fig. 8
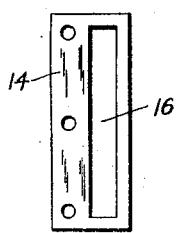
Fig. 7
INVENTOR.
Roland C. Ricketts
BY M. C. Frank
ATTORNEY.

Sept. 21, 1926.

R. C. RICKETTS 1,600,566

FRUIT PICKER

Filed Jan. 27, 1925   3 Sheets-Sheet 3

INVENTOR.
Roland C Ricketts
BY M. C. Frank
ATTORNEY.

Patented Sept. 21, 1926.

1,600,566

UNITED STATES PATENT OFFICE.

ROLAND C. RICKETTS, OF OAKLAND, CALIFORNIA.

FRUIT PICKER.

Application filed January 27, 1925. Serial No. 5,000.

My invention relates to an improved fruit picker for fruit of the smaller variety, such as cherries or even berries, and is especially adapted for the picking and receiving of small fruit that grows on trees or comparatively high bushes where the picker is required to reach overhead.

The primary object of my invention is to provide a device of the class described that will not only greatly aid the picker, but will also insure a perfect condition of the fruit picked, and leave the fruit buds and limbs unscathed. In other words, cherries or other easily bruisable fruit may be picked without the slightest injury thereto, either in the act of picking the same or in the act of transferring the fruit to the packing box or other container.

With my improved device, cherries may be picked and collected in one and the same operation, so to speak, so that the picker is practically concerned only in the picking operation, as compared to the old methods which require the picker to interrupt the picking operation at intervals, to deposit the picked fruit in the collecting receptacle. In my case, the picker is relieved of this inconvenience and waste of time, by the incorporation of a collecting receptacle in combination with the picker per se.

I have also kept in mind the desirability of making the device as simple as possible, consistent with durability, so that the equipment may be offered to the trade at a reasonable price.

The invention possesses other advantageous features, some of which, with the foregoing, will be set forth at length in the following description where I shall outline in full that form of the invention which I have selected for illustration in the drawings accompanying and forming part of the present specification. In said drawings I have shown one form of my invention, but it is to be understood that I do not limit myself to such form, since the invention, as expressed in the claims, may be embodied in a plurality of forms.

Figure 2:
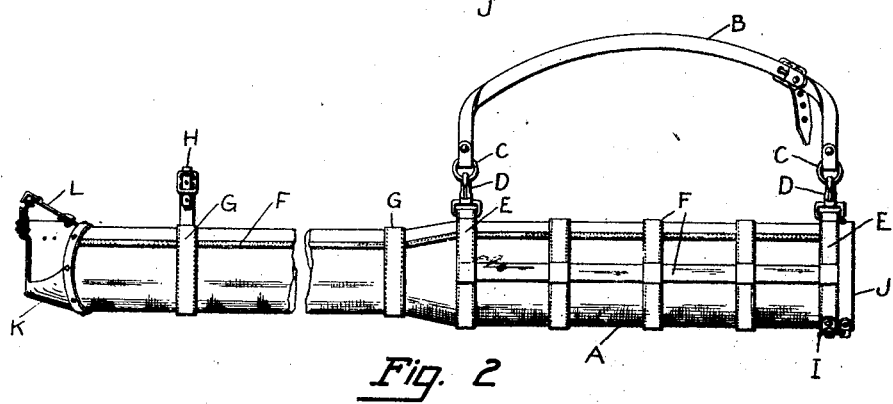
Figure 9:
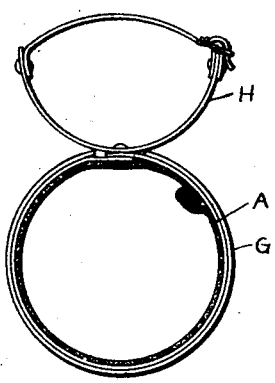
Figure 10:
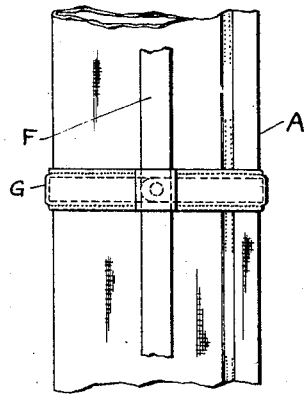
Figure 12:
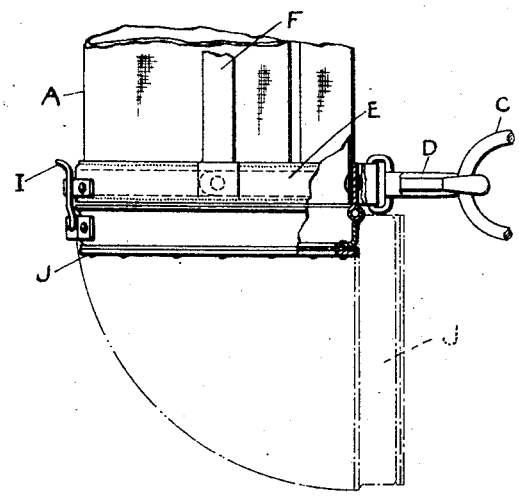
Figure 11:
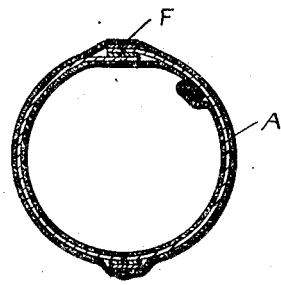

Referring to said drawings:

Figure 1 is a view in perspective of the device showing the application of the same; Fig. 2 is a view in side elevation of the device; Fig. 3 is a front view, on an enlarged scale, of the picking end of the device; Fig. 4 is a similar view from the side; Fig. 5 is a similar view in plan; Fig. 6 is a detail plan, on a further enlarged scale, of the knife structure with some of the parts broken away for clarity; Fig. 7 is a detail view of the knife guide; Fig. 8 is a detail view in cross-section of the knife assembly on the centerline of the knife pivot; Fig. 9 is a cross-section through the collecting receptacle sleeve; Fig. 10 is a side view of a section of the collecting receptacle, and Fig. 11 is an end view thereof; and Fig. 12 is a view, and partly in section, of the discharge end of the collecting receptacle, the light lines showing the bottom swung open.

Referring now to the drawings in detail: The letter A represents the collecting receptacle of the device and I prefer to make the same from canvas or some other material suitable for the purpose, so as to make up a relatively long flexible barrel. The receptacle should be of a length to reach from an extended elevated position of the right hand to the lowered position of the left hand.

The device may be carried upon the body of the picker by the shoulder strap B, having rings C for the snaps D, the latter being fixed to encircling straps or bands E. The lower portion of the receptacle is enlarged and reinforced by stiffening straps F running both longitudinally of the receptacle and encircling the same. One of the longitudinal straps extend the length of the receptacle, and at least one or two of the encircling bands are placed around the smaller diameter or sleeve of the receptacle as at G. One of the last-named bands provides a fastening means for the arm strap H.

The length and structural features of the receptacle are such as to provide a long flexible, or at least semi-flexible tube-like collecting receptacle where the fruit, as it is cut, is dropped into the receiving end and collected at the opposite end without handling or otherwise subjecting the fruit to injury. The length and diameter of the receptacle is such as to hold a considerable quantity of fruit; however, rather than have the fruit pile up above the large diameter of the receptacle it would be best to discharge the contents. The discharge is preferably effected by releasing the catch I and thus permitting the hinged bottom-closure J to drop, the catch I being located within easy reach of the left hand of the picker.

The receiving end of the receptacle is equipped with a stiff unyielding and basket-like part K made from sheet metal or other materials so as to leave an open top side for receiving the fruit in the basket before the stems are cut and a hand-hold or grip over the end. The hand-hold is made so that the fingers may grip the end firmly in the palm of the hand, with the thumb free to press against the hinged or pivotally mounted knife-blade mounting L. To realize a firm grip on the device, and prevent its slipping out of the hand of the operator a scabbard-like piece M is secured in place to overlay the fingers. Attention is also called to the depressed end in the hand-hold, Fig. 3, which will protect the fingers more than by leaving them protruding beyond the plane of the knife-guide mounting.

The receiving or picking end is handled, as best shown in Fig. 1, and the left hand is left practically free except that it may be useful to support the discharge end, especially when the load gets heavy.

The knife and its co-operating structure comprises a blade 5 pivoted as at 6 between the spaced and parallel parts 7 and 8 of the mounting L. This mounting L is pivoted on a pintle 9 and includes a coiled spring 10 for returning the mounting and knife to the open position when the thumb pressure is released. In order to get a slicing or draw cutting action from the knife, the cutting edge is ground on a slant and a leaf-spring 11 is fixed to press against the end of one edge, Fig. 6. Furthermore, the notched end 12 is received in the slot of a guide 13 and when it abuts against the end of the slot, further pressure by the thumb will move the blade about its pivot against the spring 11, so that the blade has a shearing action across the fruit stems. The blade 5 also engages between the jaws 14, one of which is ground to co-operate with the blade in the cutting action. The jaws act as guides, and the same are riveted as at 15 to the upwardly projected part of the basket K (see Fig. 3). The other of said jaws 14 is slotted as at 16 to clear the knife space between the jaws, Fig. 8. When not in use a catch 17 is engaged in a notch 18 to hold the knife mounting L closed.

The use of the device is best expressed in Fig. 1. The right hand simply grips the basket K in a natural grasp and the thumb works the knife over the stems of the fruit already in the basket. By releasing the thumb pressure, the knife springs open, so that it is a simple matter to direct the device so that the fruit is enclosed thereby and thus presents the fruit stems in cutting position, and when the stems are cut, the fruit drops from the basket and through the sleeve into the receptacle portion.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, what I claim as new and desire to secure by Letters Patent of the United States is the following:—

1. In a fruit picker, a fruit-stem cutting device comprising a stiff and unyielding closure adapted to receive and to enclose the fruit therein before the stems are cut and to be held and operated by one hand of the operator for cutting the stems, the device including a mounting member pivotally secured to the closure and having a knife blade pivotally secured to the mounting; a cutting member fixed to the closure and adapted to co-operate with the knife blade for cutting the stems; spring means for normally holding the knife blade away from said cutting member; and means adapted to abut against each other, when the knife blade is moved towards the cutting member, and to move the knife blade on its pivot so as to produce a shearing action of the blade simultaneously with the movement of the mounting member towards the cutting member.

2. In a fruit picker, a fruit-stem cutting device comprising a stiff and unyielding closure adapted to receive the fruit therein before the stems are cut and to be held and operated by one hand of the operator for cutting the stems, the device including a mounting member pivotally secured to the closure and having a knife blade pivotally secured to the mounting; guides fixed to the closure for guiding the knife blade; one of the guides being in the form of a cutting member adapted to co-operate with the knife blade for cutting the stems; spring means for normally holding the knife blade away from said cutting member; and means for moving the knife blade on its pivot so as to produce a shearing action of the blade simultaneously with the movement of the mounting member towards the cutting member.

3. In a fruit picker, a fruit-stem cutting device comprising a stiff and unyielding closure adapted to receive the fruit therin before the stems are cut and to be held and operated by one hand of the operator for cutting the stems, the device including a mounting member pivotally secured to the closure and having a knife blade pivotally secured to the mounting; a cutting member fixed to the closure and adapted to co-operate with the knife blade for cutting the stems; spring means for normally holding the knife blade away from said cutting member; other spring means for normally holding the edge of the knife blade at an angle to the edge of the cutting member; and an abutment on the closure adapted to contact with the knife blade when the blade is moved towards the cutting member and to move the knife blade on its pivot so as to produce a shearing action of the blade simultaneously with the movement of the mounting member towards the cutting member.

In testimony whereof I affix my signature.

ROLAND C. RICKETTS.